US007535859B2

(12) United States Patent
Brox

(10) Patent No.: US 7,535,859 B2
(45) Date of Patent: May 19, 2009

(54) VOICE ACTIVITY DETECTION WITH ADAPTIVE NOISE FLOOR TRACKING

(75) Inventor: Wolfgang Brox, Kalchreuth (DE)

(73) Assignee: NXP B.V., Eindhoven (NL)

( * ) Notice: Subject to any disclaimer, the term of this patent is extended or adjusted under 35 U.S.C. 154(b) by 488 days.

(21) Appl. No.: 10/575,571

(22) PCT Filed: Oct. 8, 2004

(86) PCT No.: PCT/IB2004/052025

§ 371 (c)(1),
(2), (4) Date: Apr. 11, 2006

(87) PCT Pub. No.: WO2005/038773

PCT Pub. Date: Apr. 28, 2005

(65) Prior Publication Data

US 2007/0110263 A1 May 17, 2007

(30) Foreign Application Priority Data

Oct. 16, 2003 (EP) ................................ 03103839

(51) Int. Cl.
*H04B 3/20* (2006.01)

(52) U.S. Cl. ...................... 370/290; 370/289; 370/286; 704/214

(58) Field of Classification Search ................. 370/290, 370/286, 282, 276, 389; 379/406.1, 406.8, 379/406.6; 381/110; 704/214, 211, 201, 704/200, 226

See application file for complete search history.

(56) References Cited

U.S. PATENT DOCUMENTS

| | | | | |
|---|---|---|---|---|
| 5,548,642 | A * | 8/1996 | Diethorn | 379/406.14 |
| 5,566,167 | A * | 10/1996 | Duttweiler | 370/290 |
| 5,828,754 | A * | 10/1998 | Hogan | 341/69 |
| 6,249,757 | B1 * | 6/2001 | Cason | 704/214 |
| 7,043,428 | B2 * | 5/2006 | Li | 704/233 |
| 7,072,831 | B1 * | 7/2006 | Etter | 704/226 |
| 2004/0054528 | A1 * | 3/2004 | Hoya et al. | 704/211 |

OTHER PUBLICATIONS

Bellanger and Evci. An Efficient Step Size Adaptation Technique for LMS Adaptive Filters. Acoustics, Speech and Signal Processing, IEEE International Conference on ICASSP '85. vol. 10, Apr. 1985, pp. 1153-1156.*

* cited by examiner

*Primary Examiner*—Ricky Ngo
*Assistant Examiner*—Dewanda Samuel

(57) ABSTRACT

The present invention relates to a method and apparatus for detecting voice activity in a communication signal, wherein filter means are provided for estimating or suppressing an offset component of the level of the communication signal. A filter parameter is controlled based on the output of the filter means. Furthermore, the estimation or suppression of the offset component is limited in response to the output of the filter means. The filter means may be based on a non-linear adaptive notch level filter or a noise floor tracking filter. Thereby, the tracking behavior of noise floor estimation to sudden rises in noise floor can be improved and the voice activity detection can work efficiently over a wide dynamic range.

8 Claims, 7 Drawing Sheets

VOICE ACTIVITY DETECTION WITH ADAPTIVE NOISE FLOOR TRACKING

The present invention relates to a method and apparatus for detecting voice activity in a communication signal of a telecommunication system in the main area of mobile and cordless applications, and more particularly to be used for automated gain control devices for estimation of active speech level in noisy environments.

In communication systems where speech signals are transmitted to a listener or recorded by a telephone answering machine, it is desirable to adjust the level of the speech signal automatically to a predefined reference level, no matter what the actual speech level is. This increases audibility and listener comfort. The regulation mechanism of the corresponding automatic gain control device which should put the output level to the reference value needs a reliable measurement and estimation of the long-term active speech level. The control device should also have the capability to prevent undesirable boosting of the background noise during speech causes. This demands a voice activity detection circuit (VAD) which works well even in the presence of high background noise levels which may vary considerably from time to time.

FIG. 1 shows time-dependent signal diagrams of a clean speech signal s (upper diagram) and a short-term level signal S generated from the clean speech signal. In such a case with absence of noise, voice activity detection can be performed by comparing the level signal with an absolute threshold to identify segments with active speech. This is typically done by applying a low-pass or smoothing filter to the squared input samples of the signal s (short-term power estimation) or to the absolute value of the input samples (short-term magnitude level estimation). The low-pass filter may be a digital first order recursive filter (Infinite Impulse Response (IIR) Filter) used for so-called leaky integration. A time constant parameter $\alpha$ of the filter is typically selected in a range of $2^{-5}$ to $2^{-7}$ for a sampling rate of 8

To place particular emphasis on the onsets of the speech signal the parameter can be switched depending on rising or falling level. Voice activity is now detected if the short-term level S of the clean speech signal s is above the fixed absolute threshold parameter TH_A. This can be expressed by the following expression:

$$VAD=1 \text{ if } S(i)-TH\_A>0 \qquad (1)$$

FIG. 2 shows a schematic block diagram of a voice activity detector as described for example in document EP 0 110 464 B2. According to FIG. 1, a noisy speech signal is supplied via an input terminal E to an analogue/digital (A/D) converter 2 which generates sample values x(k) at a predetermined sample timing, where k is an integer number and designates a sequence number of the sample values. Then, the sample values x(k) are supplied to a noise floor estimation unit 4 which is arranged to estimate the background noise present in the digital representations, i.e. sample values x(k), of the received speech signal. In parallel, the sample values x(k) are also supplied to a signal power level estimation unit 6 which performs computations and/or processing in order to determine the signal power present in the received speech signal. The computation and/or processing at the signal power level estimation unit 6 can be based on a determination of a squared mean value of the input sample values. The outputs of the noise floor estimation unit 4 and the signal power level estimation unit 6 are then supplied to a comparison or comparator unit 8 arranged to determine a relative threshold value based on the estimated noise floor, and to compare the estimated signal power level with this relative threshold value. Based on the result of comparison, the comparison unit 8 generates a control signal and supplies this control signal to a voice activity detection processing unit 10 which generates a VAD flag for indicating voice activity, in response to the received control signal.

Thus, the voice activity detector shown in FIG. 2 assigns its VAD flag in dependence on a threshold comparison of the value of the noisy input level with the value of an estimation of the background noise level.

FIG. 3 shows time-dependent signal diagrams similar to FIG. 1 for a case where a noisy speech signal x comprises a stationary background noise. The more stationary background noise is added like a constant offset to the clean speech signal level S to form the short-term level X of the composite signal speech with noise (solid line in FIG. 3). It is to be noted here that signals denoted by small letters correspond to the actual or real sample values as obtained from the A/D converter 2 of FIG. 2, while signals designated by capital letters correspond to level signals obtained from the original sample values by smoothing or averaging, of either the squared samples or of the magnitude of the samples, respectively.

The voice activity detection scheme should now include the property to consider how much the active parts of the speech signal x get out of the background noise which means for the short-term level of the noisy speech signal x to cross significantly a relative amount of an estimated offset level N, the so-called noise floor. The VAD decision should thus additionally include a relative threshold parameter TH_R which is weighted by the estimated noise floor, and can be expressed as follows:

$$VAD=1 \text{ if } X(i)\cdot TH\_R-N(i)-TH\_A>0 \qquad (2)$$

In FIG. 3, the estimated noise floor N is indicated as a dotted line, and the noise-weighted relative detection threshold is indicated as a dashed line. If the estimated noise floor N is first removed from the short-term level X of the noisy speech signal to get a short-term level estimation S' of a clean speech signal, this can be expressed by the changed equation:

$$VAD=1 \text{ if } S'(i)-(1-TH\_R)\cdot X(i)-TH\_A>0 \qquad (3)$$

The basic principle of a level separation, i.e. separation of the stationary noise floor N from the less stationary level of speech signals, can be applied in many applications as a VAD mechanism. This means that no additional properties of speech and noise signals, e.g. spectral structure, zero crossing rate, signal-amplitude distribution etc., are considered. In most applications, a sufficient distinction between speech and noise can be based merely on the different stationary behavior of their short-term levels. But the assumption that the noise floor will be more or less constant over the whole time has to be dropped in reality. Indeed, it is necessary to base the decision also on the possibility of slowly time varying or even abruptly changing noise floor. The VAD mechanism should thus have the feature to track the noise floor. Tracking the noise floor can be based on an update procedure of the background noise estimation, which may be achieved using a slow-rise/fast-fall technique according to which the noise floor is directly set equal to the input level if the latter falls below the noise floor estimation. On the other hand, rising input level should preferably be assigned to active speech segments and only used with care to rise the background noise level estimation, too. The goal is to reduce the interdependency between voice activity detection and background noise floor update. It has been shown that a good independent tracking behavior of the real noise floor also leads to a good performance of VAD and long-term active speech level estimation, and this again improves the overall AGC performance.

In the above document EP 0 110 467 B2, a noise floor tracking procedure with a conservative update is described, where the noise floor estimation is increased with an increment constant which only works acceptable if the noise level remains quite stable. This procedure leads to a good performance as long as the changes in the noise floor are moderate. However, the tracking of sudden increases in the noise floor is poor. It sometimes takes seconds to adapt to the new noise floor.

Another noise floor tracking solution is described in document U.S. 2002/0152066 A1, in which the tracking speed is increased considerably in case of a rising noise floor by a slope factor weighting process. The slope factor is chosen such that a constant rise time of 2.8 dB/s is achieved in the logarithmic domain. However, as the amount of increase in the noise floor update depends on the current actual noise floor estimation itself, there is never a comparable timing behavior over the whole dynamic range. This makes it difficult to work with a constant slope factor. If the first estimation of the noise floor is far away from the real noise floor, a slope factor with a much higher value should be used, and considerably reduced later on to track only the small actual deviations.

In summary, both known tracking solutions suffer in practice from the problem that the performance cannot be maintained over a wide dynamic range. It remains the main problem to find a good trade-off between mutually exclusive possibilities, i.e. do not follow too much the speech level during speech activity, but track quickly enough an increased noise level.

It is therefore an object of the present invention to provide a voice activity detection scheme, by means of which trackability of noise floor estimation can be improved over a wide dynamic range.

This object is achieved by a voice activity detection apparatus as claimed in claim 1 and by a voice activity detection method as claimed in claim 7.

Accordingly, a simple and robust solution for tracking the noise floor in voice activity detection is provided. In contrast to prior-art solutions, a wide dynamic range and a good interdependency between voice activity detection and fast and reliable noise floor tracking can be achieved. The noise floor estimation is done upwards with a filter having time-variant filter coefficients which determine the tracking speed. If the level of the input communication signal is above the estimated offset component, i.e. noise floor, a rising noise level is assumed and the filter coefficients can be chosen such that the tracking speed is more and more increased. On the other hand, if the level of the input communication signal is below the estimated offset component, the tracking speed can be reduced at once in order to avoid the problem that the estimated noise floor follows the speech level. The present solution thus provides improved noise floor tracking during sudden rises of the noise floor and works well over a large dynamic range.

According to a first aspect, the filter means may comprise a notch-type filter with a notch at zero frequency, and the limitation means may comprise a non-linear element with limitation characteristic for suppressing transmission of negative signals to the recursive path of the notch-type filter. Thus, by adding the non-linear element into the recursive path of the notch-type filter, it is assured that the subtraction of the offset component in the notch-type filter never results in a negative output level value.

According to a second aspect, the filter means may comprise a low-pass filter for extracting the offset component, and the limitation means may comprise comparing means for comparing the extracted offset component with the communication signal and switching means for selecting either the extracted offset component or the communication signal in response to an output of the comparing means. Hence, the low-pass filter directly estimates the noise floor while the switching means directly copies the input level to the noise floor if the input level falls below the noise floor. Thereby, a quick downward update can be obtained.

The parameter control means may be adapted to set the filter parameter to a first value which leads to a lower tracking speed of the estimation, if the level of the communication signal falls below the level of the estimated offset component, and to set the filter parameter to a second value which leads to a higher tracking speed of the estimation, if the level of the communication signal is higher than the level of the estimated offset component. Specifically, the parameter control means may work with an exponential adaptation of the filter parameter within the limitation of a minimum value and a maximum value and may be reset to the minimum value in dependency on the comparing means. Thereby, the adaptation of the filter parameter corresponds to the preferable slow-rise/fast-fall technique. A stable estimation of the noise floor during speech activity can thus be obtained.

The present invention will now be described on a basis of preferred embodiments with reference to the drawings, in which.

Figure 1:
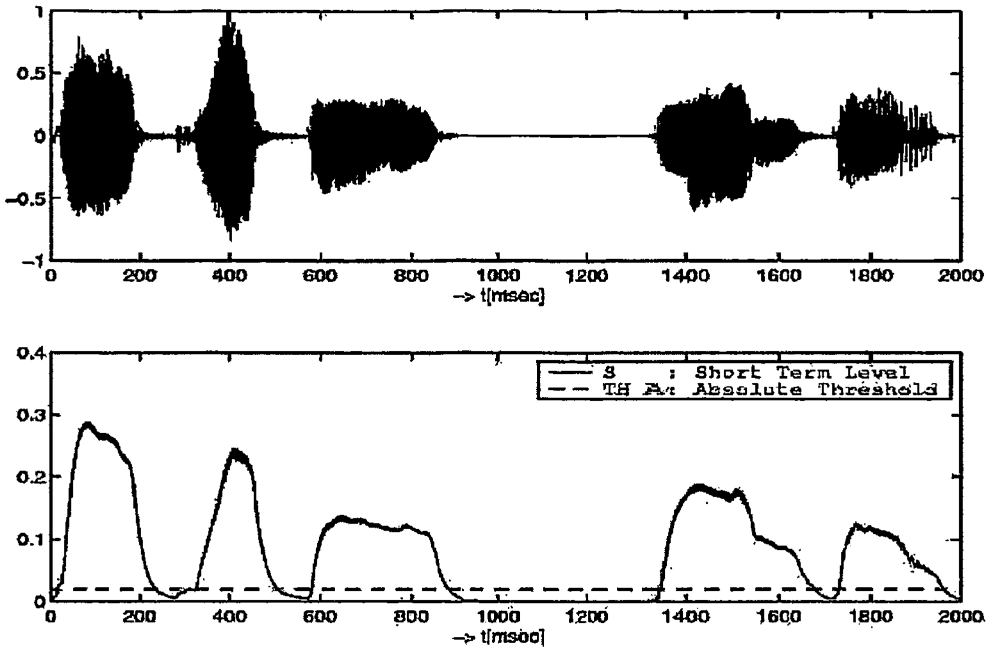
FIG. 1 shows signaling diagrams indicating a principle of voice activity detection for clean speech.
Figure 2:
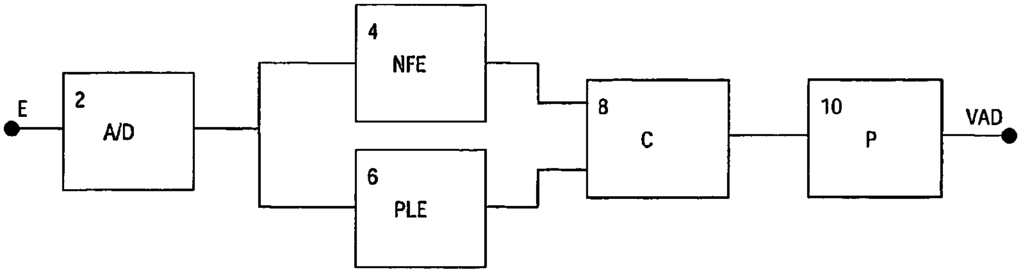
FIG. 2 shows a state of the art schematic block diagram of a voice activity detector arrangement.
Figure 3:
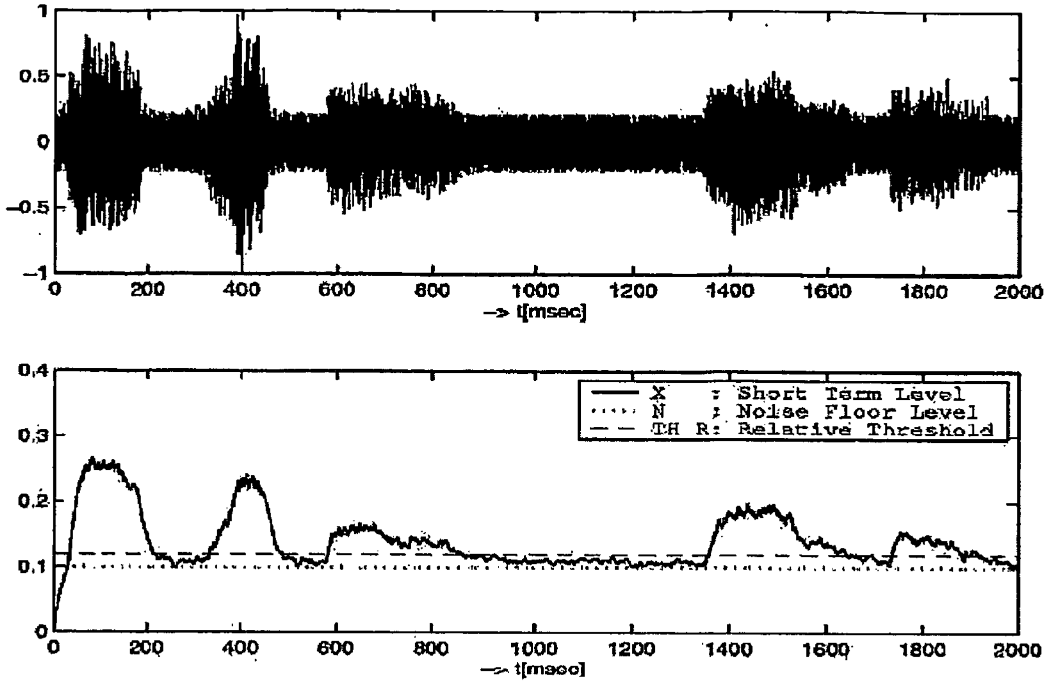
FIG. 3 shows signaling diagrams indicating the principle of voice activity detection for noisy speech signals.
Figure 4:
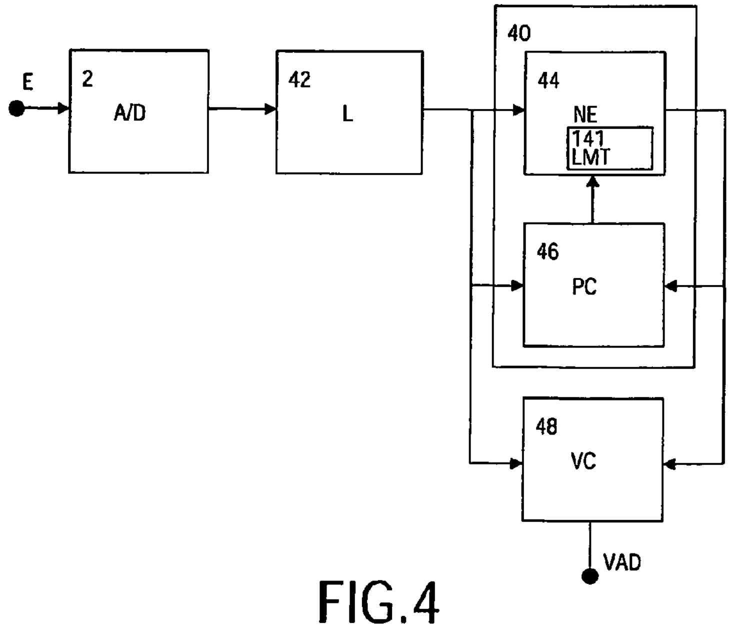
FIG. 4 shows a schematic block diagram of a voice activity detector arrangement in which the present invention can be implemented.

In the following, the preferred embodiments will be described on a basis of a voice activity detection scheme as indicated in FIG. 4. According to FIG. 4, a noisy speech signal is supplied via an input terminal E to an analogue/digital (A/D) converter 2, similar to the arrangement of FIG. 2. Then, the sample values are supplied to a level calculation means 42 for calculating smoothened short-term level values X of said sample values. The smoothened level values X are supplied to a noise floor estimation unit 44 which comprises a limitation functionality 141 and is arranged to estimate the background noise floor present in the digital representations, i.e. smoothened level values, of the received speech signal. In parallel, the smoothened level values are also supplied together with the estimation output of the noise floor estimation unit 44 to a parameter control unit 46 which controls filter parameters of a filter function provided in the noise floor estimation unit 44 and to a voice activity control unit 48 which generates the VAD control signal, e.g., the VAD flag.

According to the preferred embodiments, the proposed voice activity detector works with a combination of predetermined relative and absolute threshold values and indicates speech activity if the short-term input level values, e.g. low-pass filtered absolute values of input samples, is significantly above a noise floor estimation value. Based on the relative threshold, the input level values are weighted and then subjected to noise floor subtraction. Finally, the absolute threshold is related to the clean speech signal level values obtained as a result of the noise floor subtraction, so as to generate the VAD control signal, e.g., as defined in the above equation (2).

In the following preferred embodiments, the functions of the noise floor estimation unit 44 and the parameter control unit 46 are combined in a single estimation processing unit 40.

The update of the noise floor is generally achieved with a reduced rate on a sub-sampled base of the original sampling rate. The noise floor estimation performed in the noise floor estimation unit 44 of FIG. 4 is achieved with a filter having at least one time-variant filter coefficient which determines the actual tracking speed. This filter can be adapted to estimate or calculate the noise floor or, as an alternative, to cancel it out directly from the input signal level values. If the input level value falls below the noise floor estimation, a limitation of the noise floor estimation is performed by the limitation functionality 141 and the adaptive filter coefficient can be reset to a minimum slow tracking speed value from which on it will be increased e.g. by an exponential function up to a maximum fast tracking speed.

According to the first preferred embodiment, a non-linear adaptive notch filter is used for noise floor canceling. Thus, an estimation of a clean speech signal level value S' is obtained in the noise floor estimation unit 44. This clean speech signal level value S' and the input level value X can be supplied directly to the voice activity control unit 48, where the VAD threshold comparison could be performed. As an alternative, the noise floor estimation unit 44 may determine the noise floor by subtracting again the estimated clean speech signal level value S' from the noisy speech level value X.

A notch filter with a notch at zero frequency removes a DC component of a signal. The difference equation and Z-transformation of such a general first order recursive filter are given in the following equation:

$$y(k) = x(k) - x(k-1) + \gamma \cdot y(k-1) \tag{4}$$

$$H_z(z) = \frac{z-1}{z-\gamma}$$

By means of the filter coefficient γ, the sharpness of the notch resonance can be controlled. If the filter parameter γ moves towards "1", the notch gets more distinctive. On the other hand, the filter response time will increase.

Figure 5:
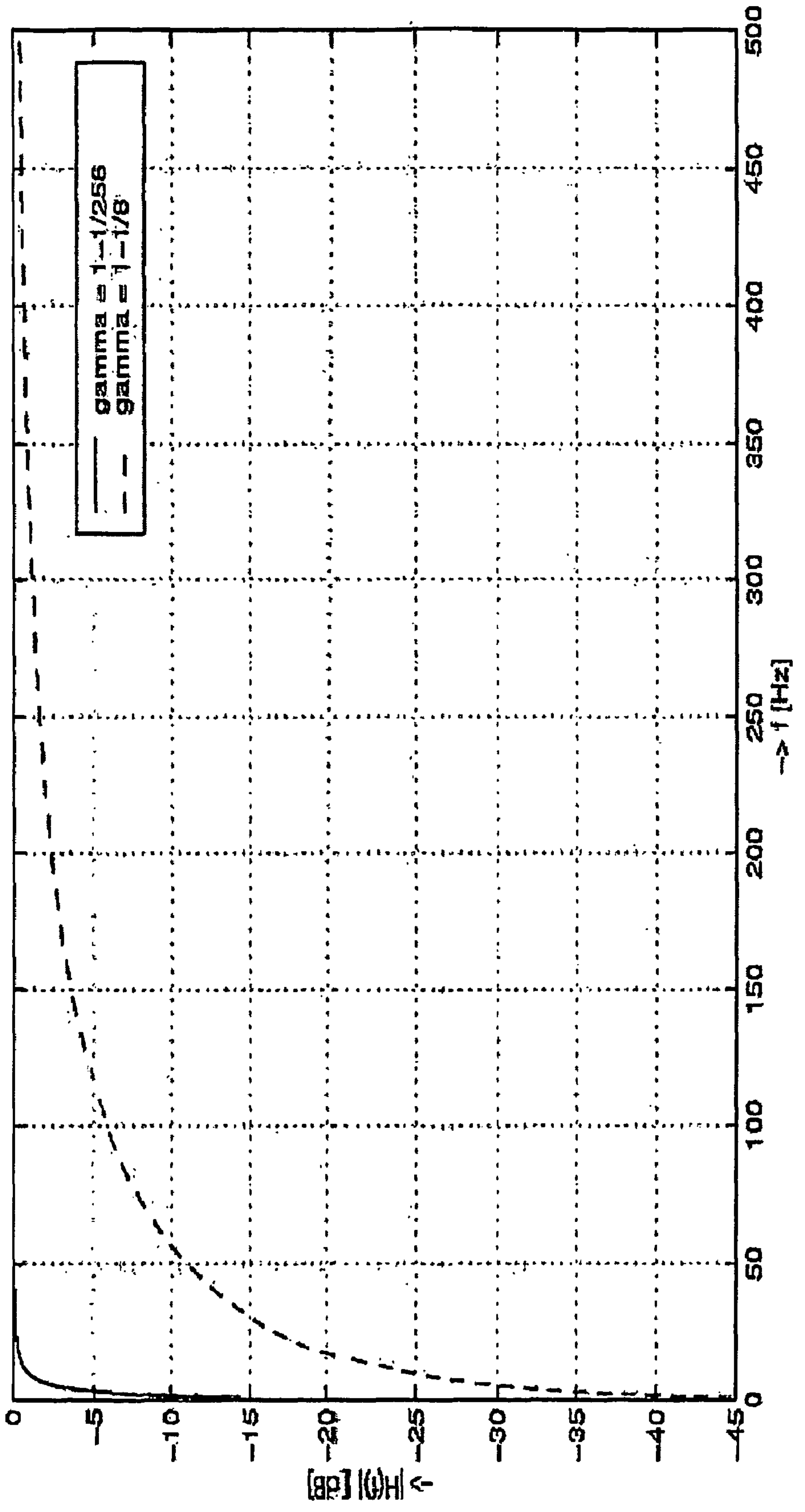
FIG. 5 shows a diagram indicating the frequency response of a notch filter.

FIG. 5 shows a frequency response of a general DC notch filter for two different settings of the filter parameter γ. As can be gathered from FIG. 5, the higher value of the filter coefficient γ (which corresponds to the solid line), provides a more distinctive filtering operation as compared to the lower value of the filter coefficient γ indicated by the dashed line.

However, the direct application of the DC notch filter to the noisy speech level values X will not help to remove the noise floor, since this is not the DC part of the composite level. The noise floor can only be removed if it is assured that the subtraction of the constant offset level never results in a negative output level value. This can be achieved by adding a non-linear filter element with a limitation curve into the recursive path of the DC notch filter. Thereby, the clean speech signal level values S' always assume a value larger or equal zero.

Figure 6:
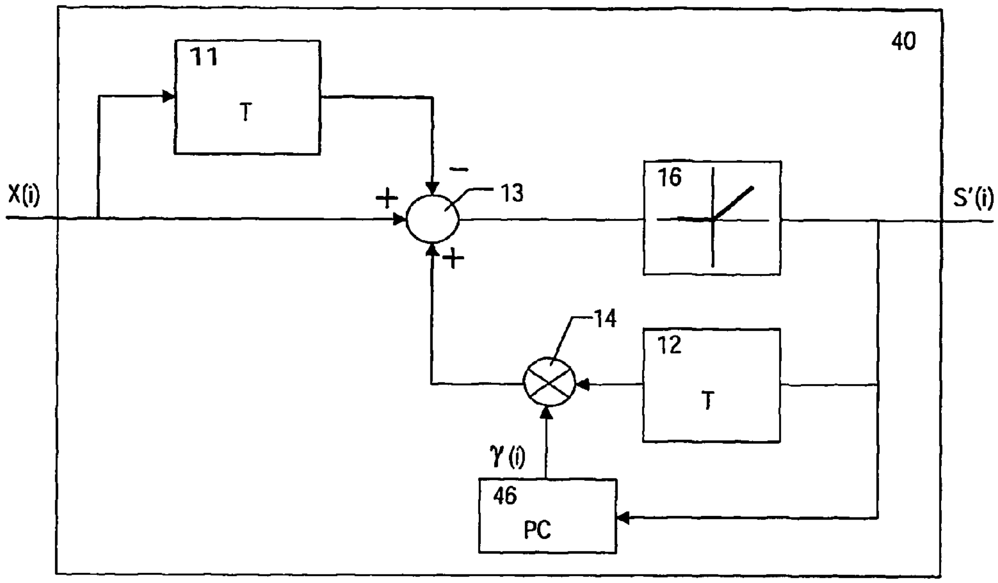
FIG. 6 shows schematic functional block flow diagram of a non-linear adaptive notch level filter according to a first preferred embodiment of the present invention.

FIG. 6 shows a schematic functional flow diagram of an example of the estimation processing unit 40 with the non-linear adaptive notch level filter according to the first preferred embodiment. As can be gathered from FIG. 6, a non-linear element 16 with a limitation curve has been introduced into the recursive path and thus provides the limitation functionality 141 of FIG. 4. The limitation curve serves to block or suppress signals having a value less than zero, while positive signals are passed. This assures that the clean speech signal levels S' always assumes positive values. According to the usual DC notch filter structure, the input signal level values X are directly supplied to an arithmetic function 13 by which the input signal level values X are added to delayed input signal level values X(i−1) which have been delayed at a first delay element 11 by one sample period. Furthermore, a feedback signal generated from the clean speech signal level values S'(i−1) of the last sample period is added to generate the actual clean speech signal level values S'(i). The feedback signal is obtained by delaying the last clean speech level signal value S'(i−1) in a second delay element 12 by one sample period and multiplying or weighting the delayed signal by a filter parameter γ(i) in a multiplier 14. To deal with the demands for a good performance over the whole dynamic range, the filter parameter γ(i) is made adaptive, as described later. Thereby, a non-linear adaptive notch-level filter is obtained. The adaptive filter parameter γ(i) is generated at a parameter control unit 46 to which the output clean speech signal level values S'(i) are supplied. In view of the fact that the clean speech signal level values S'(i) already correspond to the difference between input signal level values X(i) and the noise floor N(i), it is sufficient here to only supply the clean speech signal level values to the parameter control unit 46.

The cancellation of the DC component or offset by the DC notch filter can also be regarded as a procedure in which, at first, an estimation of the offset component is formed by a low-pass filter operation, and then, the offset signal is subtracted from the original input signal to obtain the offset free or clean output signal.

Figure 7:
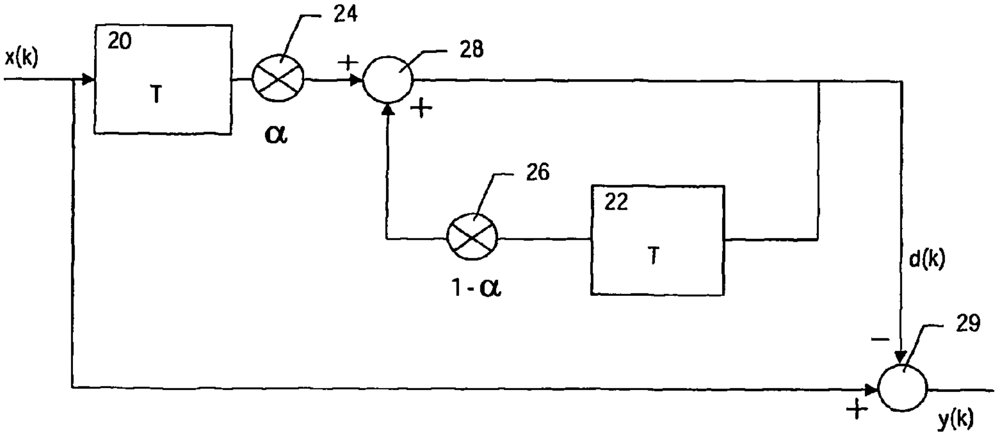
FIG. 7 shows a schematic functional flow diagram of an offset subtraction filter which can be used in a second preferred embodiment of the present invention.

FIG. 7 shows a schematic functional flow diagram of a processing or procedure equivalent to a linear DC notch filtering operation. Here, at first, an estimation of the offset signal d(k) is obtained by low-pass filtering of the input signal x(k). Then, this offset signal d(k) is subtracted. The low-pass filtering of the input signal x(k) is achieved by an IIR filter consisting of two delay elements 20, 22 with a delay corresponding to one sample period, and two multiplying or weighting elements 24, 26 for weighting or multiplying a received signal by respective filter coefficients α and (1−α). The offset signal d(k) is subtracted at a subtracting unit 29 from the original input signal x(k) to obtain the offset free output signal y(k). This offset subtraction structure shown in FIG. 6 can also be obtained by simple conversion of the equivalent equation (4). The following equation (3) corresponds to the offset subtraction filter structure of FIG. 7:

$$d(k) = (1-\alpha)\cdot d(k-1) + \alpha\cdot x(k-1) \text{ with } \alpha = 1-\gamma$$

$$y(k) = x(k) - d(k) \tag{5}$$

Figure 8:
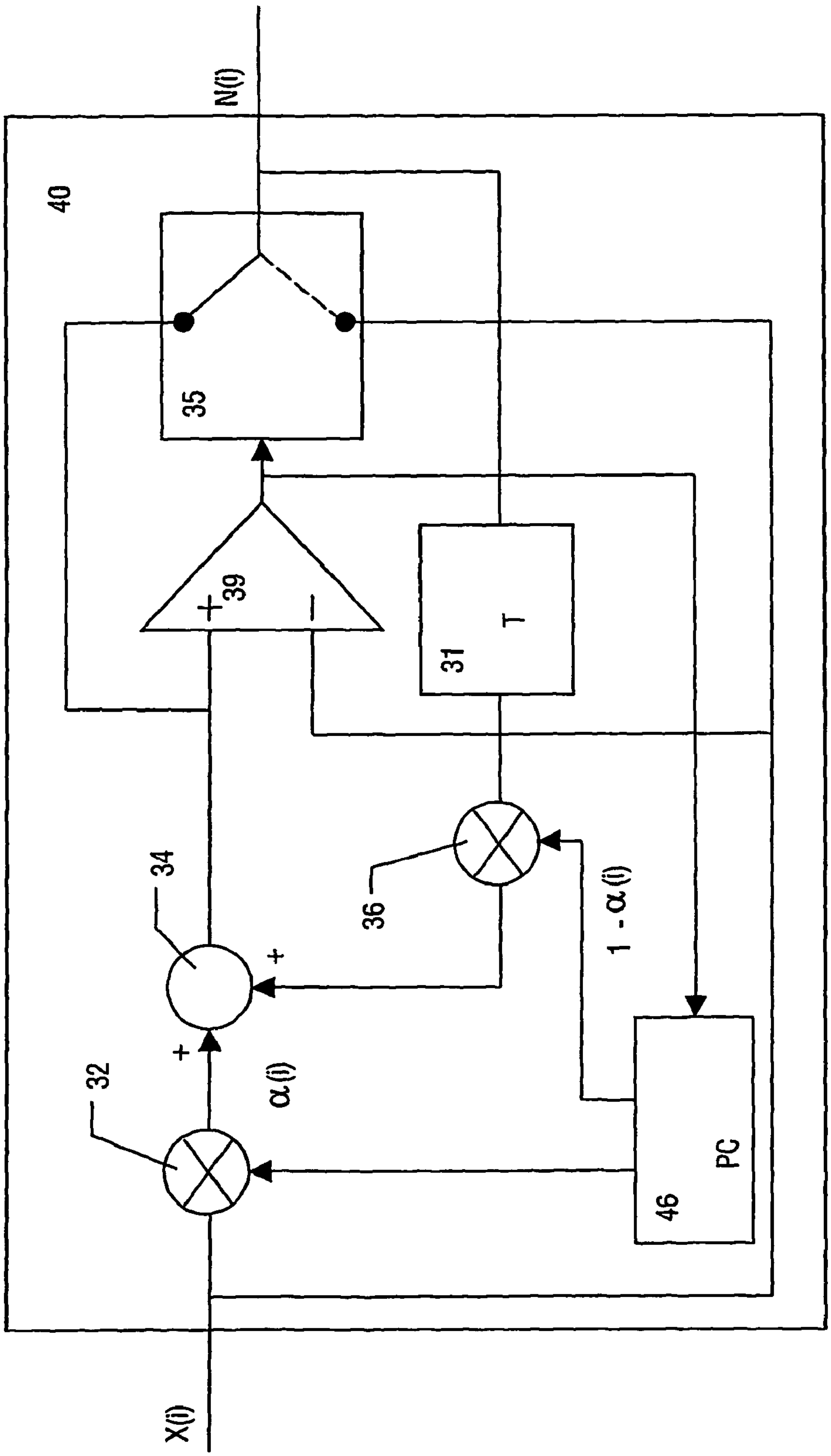
FIG. 8 shows a schematic functional flow diagram of an adaptive noise floor tracking filter according to the second preferred embodiment.

FIG. 8 shows another example of the estimation processing unit 40 with an adaptive noise floor tracking filter according to the second preferred embodiment. This filter is based on the offset subtraction filter structure shown in FIG. 7.

According to FIG. 8, a noise floor estimation N is obtained including the principle of the slow-rise/fast-fall technique mentioned above. The noise floor estimation N(i) obtained by low-pass filtering the input signal level values X(i) is compared at a comparator function 39 with the original input signal level values X(i) and the comparison result is used to control a switching function 35 which either switches the noise floor estimation N(i) or the original input signal level values X(i) to the output as the final noise floor estimation N(i). The comparator function 39 and the switching function 35 thus serve as the limitation functionality 141 of FIG. 4. This structure can be described by the following equation:

$$N(i)=(1-\alpha(i))\cdot N(i-1)+\alpha(i)\cdot X(i)$$

$$N(i)=X(i) \text{ if } X(i)<N(i) \quad (6)$$

Similar to the first preferred embodiment, the filter parameters α(i) and (1−α(i)) are generated by a parameter control unit 46 to which the comparison output of the comparator function 39 is supplied.

Thus, by keeping in mind that the noise floor estimation N(i) can be subtracted from the input signal level value X(i) to get a noise level free speech level estimation S'(i) and that the offset subtraction filter parameter α can be derived from the notch filter parameter γ of the first preferred embodiment, a connection between the limitation function curve of the non-linear element 16 of FIG. 6 to the slow-rise/fast-fall technique in the noise floor tracking filter according to a second preferred embodiment can be established. Hence, both embodiments use the same basic principles. The usage of the non-linear adaptive notch level filter structure of the first preferred embodiment and the adaptive noise floor tracking filter structure of the second preferred embodiment is equivalent to that extend.

Figure 9:
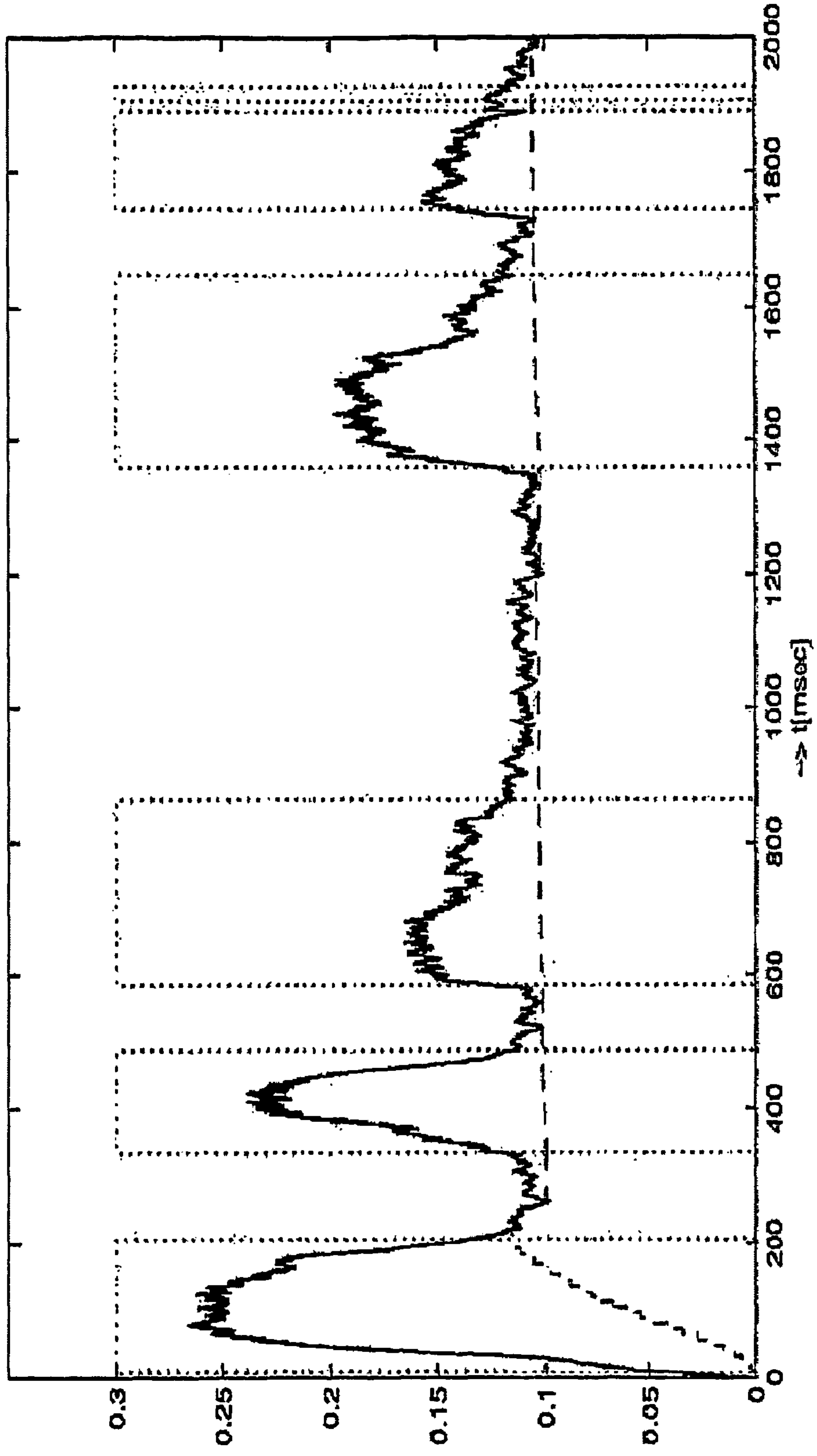
FIG. 9 shows a signal diagram indicating adaptive noise floor estimation with fast tracking according to the first and second preferred embodiments.

FIG. 9 shows a time-dependent signal diagram indicating an input level signal (solid line) and a noise floor estimation (dashed line). Additionally, the dotted rectangular signal indicates the value of the VAD flag at the output of the voice control unit 48 shown in FIG. 4. The signals shown in FIG. 9 are valid for both first and second preferred embodiments of the present invention. As can be gathered from FIG. 9, a good tracking of the real noise floor by the noise floor estimation can be obtained. Furthermore, the fast fall technique can be seen after the first speech period at a time of approximately 200 ms, where the noise floor estimation directly follows the decreasing input level signal. The improved tracking performance of the noise floor estimation leads to an improved matching of the value of the VAD flag to active speech periods.

In the following, the parameter control performed by the parameter control unit 46 of the first and second preferred embodiments is described in more detail.

The filter parameter γ of the non-linear adaptive notch level filter according to the first preferred embodiment or the filter parameter α of the noise floor tracking filter according to the second preferred embodiment both affect in general the speed of the noise floor estimation to follow a rising input signal level value X. Therefore, the adaptation control of these parameters has to be aligned with or adapted to the slow-rise/fast-fall technique. If the actual input signal level value X falls below the estimated noise floor N, which also indicates that the noise floor has already been reached, the tracking speed should be reset to a very low value. Hence, respective slow tracking values $\alpha_{min}=\alpha_{slow}$ and $\gamma_{max}=\gamma_{slow}$ are selected to avoid that the noise floor estimation follows the speech level. On the other hand, if the opposite condition holds on for longer time intervals then the length of non-stationary speech sections, i.e. the input signal level value X is higher than the noise floor estimation level N, a rising noise floor should be assumed and the filter parameter should now be made more and more sensitive, i.e. the tracking speed is increased by successively increasing the filter parameters until respective fast tracking values $\alpha_{max}=\alpha_{fast}$ and $\gamma_{min}=\gamma_{fast}$ have been reached.

The successive change of the filter parameters can be based on an exponential adaptation within the above two limiting values. To achieve this, an interim state variable a(i) can be introduced including a start value $a_s$ and a coefficient $c_a$. Now, the adaptive non-linear notch level filter structure according to the first preferred embodiment may perform a filter parameter update at the parameter control unit 18 according to the following equation (6):

$$a(i)=(1+c_a)\cdot a(i-1) \text{ if } S'(i)=X(i)-N(i)>0 \quad (7)$$

$$a(i)=a_s \text{ otherwise restart}$$

$$\gamma(i)=\max[\gamma_{min}, (\gamma_{max}-a(i))]$$

Furthermore, the parameter control unit 38 of the noise floor tracking level filter structure according to the second preferred embodiment may perform a filter parameter update according to the following equations (7):

$$a(i)=(1+c_a)\cdot a(i-1) \text{ if } X(i)>N(i) \quad (8)$$

$$a(i)=a_s \text{ otherwise restart}$$

$$\alpha(i)=\min[\alpha_{max}, (\alpha_{min}+a(i))]$$

This control or setting of the filter coefficients leads to a stable estimation of the stationary noise floor during speech activity. On the other hand, the tracking speed to follow a rising noise floor is optimized for the slow-rise/fast-fall principle. Thereby, good overall performance can be achieved within a wide dynamic range.

Figure 10:
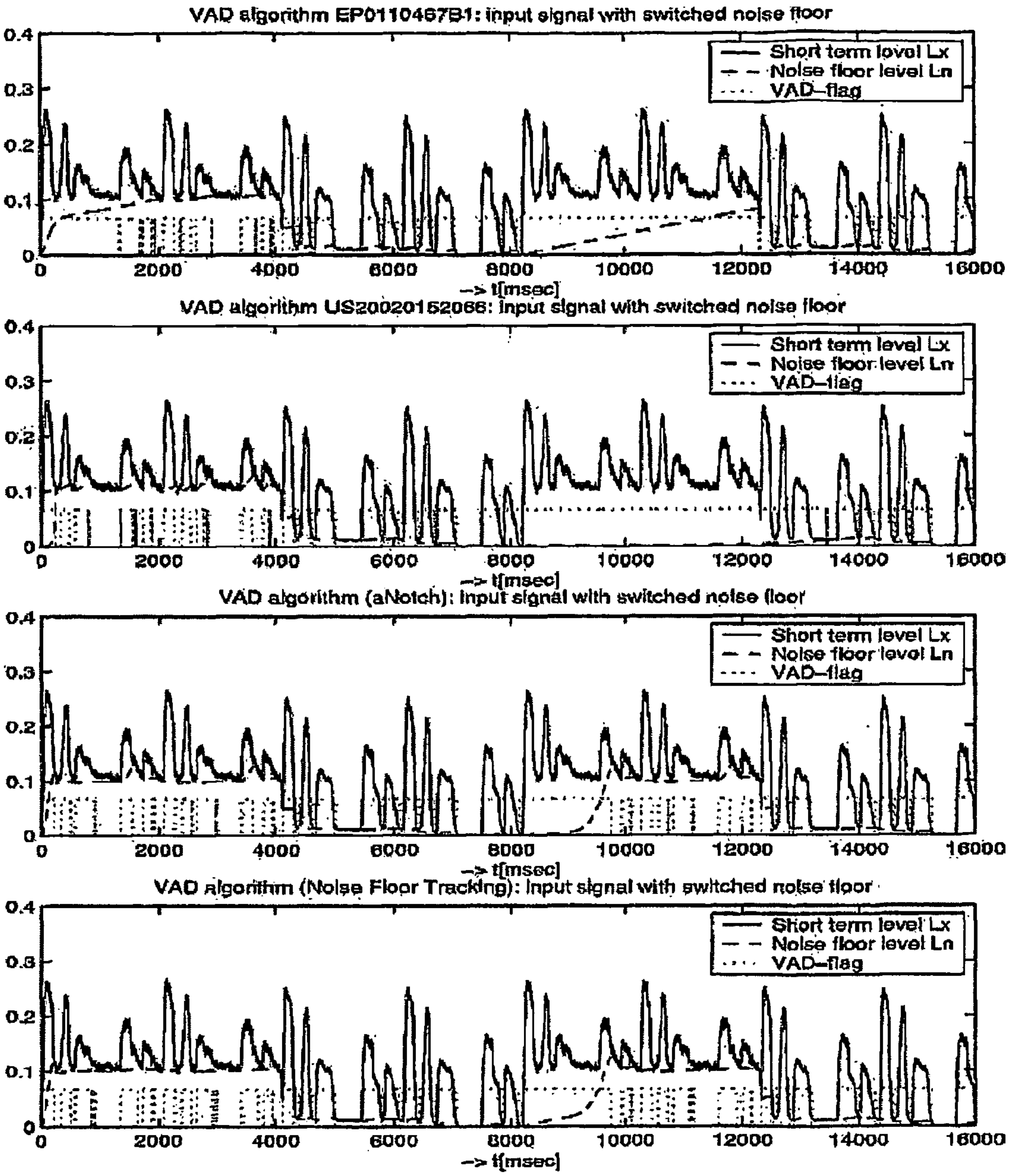
FIG. 10 shows signaling diagrams for comparing tracking behavior of different noise floor estimation schemes.

FIG. 10 show signaling diagrams for the initially described known tracking procedures and the improved adaptive tracking procedures according to the first and second preferred embodiments so as to obtain a comparison in the tracking behavior of noise floor estimation schemes.

In the upper diagram of FIG. 10, the dynamic range noise floor estimation with increment constant described in document EP 0 110 467 B2 is shown. As can be seen from this diagram, the value of the VAD flag (dotted line) cannot follow or reflect the actual speech periods at situations where the noise floor has risen suddenly, due to the fact that the noise floor tracking is too slow.

The upper second diagram indicates the dynamic range noise floor estimation with slope factor constant as described in document U.S. 2002/0152066 A1. Again, the voice activity detection behavior is insufficient in cases of strong jumping noise floor, as can be seen in the time period from t=8.000 ms to t=14.000 ms.

The lower two diagrams respectively relate to the adaptive notch filter structures and noise floor tracking structures according to the first and second preferred embodiments. After a relatively short period required for increasing the noise floor estimation, the VAD flag matches well with the actual voice activity even in cases of strong noise floor variations.

It is to be noted that the present invention is not restricted to the above preferred embodiments, but can be applied to any voice activity detection mechanism. Specifically, other filter arrangements with higher filter orders can be used for obtaining the clean speech signal level values S' or the noise floor estimation N, respectively. The elements of the functional flow diagrams indicated in FIGS. 4 and 6 to 8 may be implemented as concrete hardware functions with discrete hardware elements or as software routines controlling a signal processing device. The preferred embodiments may thus vary within the scope of the attached claims.

The invention claimed is:

1. An apparatus that detects voice activity in a communication signal, said apparatus comprising:

filter means for performing an estimation or a suppression of an offset component of a level of said communication signal;

parameter control means for controlling a filter parameter of said filter means based on an output of said filter means; and limitation means for limiting said suppression or said estimation of said offset component in response to said output of said filter means, wherein said filter means comprises a notch-type filter with a notch at zero frequency, and said limitation means comprises a non-linear element with a limitation characteristic for suppressing transmission of negative signals through a recursive path of said notch-type filter.

2. An apparatus according to claim 1, further comprising:

level calculation means for calculating a short-term level of said communication signal, and voice activity control means for comparing input and output levels of said filter means.

3. An apparatus according to claim 1, wherein said offset component is a noise floor component of the level of said communication signal.

4. An apparatus according to claim 1, wherein said filter means comprises a low-pass filter for extracting said offset component, and said limitation means comprises:

comparing means for comparing said extracted offset component with said communication signal and switching means for selecting one of said extracted offset component and said communication signal in response to an output of said comparing means.

5. An apparatus according to claim 1, wherein said parameter control means is adapted to set said filter parameter to a first value which leads to a lower tracking speed of said estimation, when the level of said communication signal falls below a level of said estimated offset component, and to set said filter parameter to a second value which leads to a higher tracking speed of said estimation, when the level of said communication signal is higher than the level of said estimated offset component.

6. An apparatus according to claim 5, wherein said parameter control means is adapted to apply an exponential adaptation of said filter parameter within a limitation of predetermined parameter values.

7. A method of detecting voice activity in a communication signal, said method comprising:

filtering an offset component of a level of said communication signal;

controlling a filter parameter used in said filtering, based on a result of said filtering step; and limiting said filtering in response to the result of said filtering, wherein said filtering is adapted to suppress said offset component by applying a filter characteristic with a notch at zero frequency, and said limiting is performed by applying a limitation characteristic for suppressing transmission of negative signals.

8. A method according to claim 7, wherein said filtering is adapted to extract said offset component, and said limiting further comprises:

comparing the extracted offset component with the level of said communication signal and selecting one of said extracted offset component and said level of said communication signal in response to a comparing result.

* * * * *